United States Patent [19]

Smith

[11] Patent Number: 5,793,568
[45] Date of Patent: Aug. 11, 1998

[54] AIR BEARING SLIDER DEFLECTION APPARATUS AND METHOD FOR FABRICATING SAME

[75] Inventor: Gordon J. Smith, Rochester, Minn.

[73] Assignee: International Business Machines Corporation, Armonk, N.Y.

[21] Appl. No.: 797,885

[22] Filed: Feb. 10, 1997

Related U.S. Application Data

[62] Division of Ser. No. 407,780, Mar. 21, 1995, Pat. No. 5,625,512.

[51] Int. Cl.$^6$ .................................................. G11B 5/60
[52] U.S. Cl. .................................................. 360/103
[58] Field of Search .................................. 360/103, 104

[56] References Cited

U.S. PATENT DOCUMENTS

| | | | |
|---|---|---|---|
| 4,699,011 | 10/1987 | Lemke | 360/103 |
| 4,814,906 | 3/1989 | Suzuki et al. | 360/75 |
| 4,853,810 | 8/1989 | Pohl et al. | 360/103 |
| 5,021,906 | 6/1991 | Chang et al. | 360/103 |
| 5,034,828 | 7/1991 | Ananth et al. | 360/103 X |
| 5,062,017 | 10/1991 | Strom et al. | 360/103 |
| 5,067,037 | 11/1991 | Ananth et al. | 360/103 |
| 5,157,568 | 10/1992 | Katayama et al. | 360/103 |
| 5,204,795 | 4/1993 | Mitsuhashi | 360/104 |
| 5,220,470 | 6/1993 | Ananth et al. | 360/103 |
| 5,267,104 | 11/1993 | Albrecht et al. | 360/103 X |
| 5,327,311 | 7/1994 | Ananth et al. | 360/103 |
| 5,479,306 | 12/1995 | Ananth et al. | 360/103 |
| 5,625,512 | 4/1997 | Smith | 360/103 |

FOREIGN PATENT DOCUMENTS

| | | | |
|---|---|---|---|
| 55-105857 | 8/1980 | Japan | 360/103 |
| 61-151827 | 7/1986 | Japan | 360/103 |
| 62-46475 | 2/1987 | Japan . | |
| 63-37874 | 2/1988 | Japan | 360/103 |
| 4-28070 | 1/1992 | Japan | 360/103 |

*Primary Examiner*—John H. Wolff
*Attorney, Agent, or Firm*—Mark A. Hollingsworth

[57] ABSTRACT

A method for fabricating an air bearing slider for a data storage system including a deflection apparatus disposed on the air bearing surface of the slider. The air bearing surface of the slider is fabricated to include a transducer element mounting location biased toward a trailing edge of the slider, and a deflection apparatus disposed proximate the transducer element mounting location and biased toward a leading edge of the slider. Contact between the deflection apparatus and an asperity or disk obstruction prevents damage to a transducer element mounted at the transducer element mounting location. In accordance with one embodiment, the deflection protrusion is fabricated to include a sloping leading edge or, alternatively, comprises a plurality of deflection ridges that generally define a sloping leading edge. Alternatively, a deflection notch is provided on the air bearing surface that effectively functions as a deflection protrusion to protect a transducer element mounting location from contact with a thermal asperity or other submicron-sized obstruction on the surface of a data storage disk. A set of design equations and guidelines may be employed to derive key design dimensions for designing the configuration, orientation, and location of the deflection apparatus on the air bearing surface relative to the transducer element mounting location.

7 Claims, 14 Drawing Sheets

| FORM FACTOR (Disk Diameter) | VELOCITY a INNER DIAMETER (M/sec) | $T_c$ (sec) | S (nm) | θ (μ rad) | D (μm) | W (μm) | H (nm) |
|---|---|---|---|---|---|---|---|
| 1.8" | 3.5 | $10^{-5}$ | 30 | 120 | <35 | <7 | <<34 |
| 2.5" | 4.8 | $10^{-5}$ | 40 | 120 | 48 | 10 | 46 |
| 3.5" | 11.3 | $10^{-5}$ | 50 | 120 | 113 | 23 | 63 |
| 5.25" | 17 | $10^{-5}$ | 60 | 120 | 170 | 34 | 80 |

FIG. 8

| FORM FACTOR (Disk Diameter) | VELOCITY @ INNER DIAMETER (M/sec) | $T_C$ (sec) | S (nm) | Φ (degrees) | D (μm) | N (μm) | H (nm) |
|---|---|---|---|---|---|---|---|
| 1.8" | 3.5 | $10^{-5}$ | 30 | 10 | <35 | >>35 | 20 |
| 2.5" | 4.8 | $10^{-5}$ | 40 | 10 | 48 | 48 | 30 |
| 3.5" | 11.3 | $10^{-5}$ | 50 | 10 | 113 | 113 | 40 |
| 5.25" | 17 | $10^{-5}$ | 60 | 10 | 170 | 170 | 50 |

FIG. 14

AIR BEARING SLIDER DEFLECTION APPARATUS AND METHOD FOR FABRICATING SAME

This is a divisional of application Ser. No. 08/407,780, filed Mar. 21, 1995 now U.S. Pat. No. 5,625,512, dated Apr. 29, 1997, which applications are incorporated herein by reference.

FIELD OF THE INVENTION

The present invention relates generally to data storage systems, and, more particularly, to a method for fabricating an air bearing slider deflection apparatus.

BACKGROUND OF THE INVENTION

A typical data storage system includes one or more data storage disks coaxially mounted on a hub of a spindle motor. The spindle motor rotates the disks at speeds typically on the order of several thousand revolutions-per-minute. Digital information, representing various types of data, is typically written to and read from the data storage disks by one or more transducers, or read/write heads, which are mounted to an actuator and passed over the surface of the rapidly rotating disks.

The actuator typically includes a plurality of outwardly extending arms onto which an air bearing slider is mounted at the extreme end of the arms. One or more transducers, in turn, are mounted on the slider. Airflow produced above and below the respective surfaces of the rapidly rotating disks results in the production of an air bearing upon which the aerodynamic slider is supported, thus causing the slider to fly a short distance above the rotating disk surface.

The actuator arms are interleaved into and out of the stack of rotating disks, typically by means of a coil assembly mounted to the actuator. The coil assembly generally interacts with a permanent magnet structure, and the application of current to the coil in one polarity causes the actuator arms and sliders to shift in one direction, while current of the opposite polarity shifts the actuator arms and sliders in an opposite direction.

In a typical digital data storage system, digital data is stored in the form of magnetic transitions on a series of concentric, closely spaced tracks comprising the surface of the magnetizable rigid data storage disks. The tracks are generally divided into a plurality of sectors, with each sector comprising a number of information fields. One of the information fields is typically designated for storing data, while other fields contain sector identification and synchronization information, for example. Data is transferred to, and retrieved from, specified track and sector locations by the transducers being shifted from track to track, typically under the control of a controller. The transducer assembly typically includes a read element and a write element. Other transducer assembly configurations incorporate a single transducer element used to read and write data to and from the disks.

Writing data to a data storage disk generally involves passing a current through the write element of the transducer assembly to produce magnetic lines of flux which magnetize a specific location of the disk surface. Reading data from a specified disk location is typically accomplished by a read element of the transducer assembly sensing the magnetic field, or flux lines, emanating from the magnetized locations of the disk. As the read element passes over the rotating disk surface, the interaction between the read element and the magnetized locations on the disk surface results in the production of an electrical signal, often termed a readback signal, in the read element.

A trend has developed in the data storage system manufacturing community to miniaturize the chassis or housing of a data storage system to a size suitable for incorporation into miniature personal computers, such as lap-top and pocket-sized computers, for example. Various industry standards have emerged that specify the external housing dimensions of small and very small form factor data storage systems. One such recognized family of industry standards is the PCMCIA (Personal Computer Memory Card Industry Association) family of standards, which specifies both the dimensions for the data storage system housing and the protocol for communicating control and data signals between the data storage system and a host computer system coupled thereto.

Recently, four families or types of PCMCIA device specifications have emerged. By way of example, a Type-I PCMCIA data storage system must be fully contained within a housing having a maximum height dimension of 3.3 millimeters (mm). By way of further example, a Type-II PCMCIA device housing must not exceed a maximum height of 5.0 mm in accordance with the PCMCIA specification. A maximum height of 10.5 mm is specified for the housing of Type-III PCMCIA devices, and Type-IV devices are characterized as having a maximum housing height dimension in excess of 10.5 mm. It is anticipated that the industry trend of continued miniaturization of data storage systems will eventually result in the production of systems complying with the Type-II PCMCIA specification. Such Type-II PCMCIA data storage systems will likely have external housing dimensions of approximately 54 mm×86 mm×5 mm, and include a data storage disk having a diameter of approximately 45 mm and a width dimension similar to that of a standard credit card.

Reducing the size of a data storage system housing without sacrificing storage capacity is typically achieved by increasing the track density, or number of tracks-per-inch (TPI), of the data storage disk. It is generally desirable to reduce the separation distance between the slider/transducer assembly and the rotating data storage disk in order to increase the readback signal sensitivity of the transducer to the typically weaker magnetic transitions associated with higher density disks. When decreasing the transducer-to-disk separation distance, however, the probability of detrimental contact between the sensitive transducer and an obstruction on the disk surface significantly increases.

A prevalent surface irregularity that afflicts an appreciable percentage of conventional data storage disks is generally referred to as a thermal asperity. Thermal asperities are isolated submicron-sized particles, typically comprising silicon carbide material, that are embedded in the disk substrate. Such thermal asperities are often large enough to interfere with the flight path of a typical slider/transducer assembly by impacting with the slider/transducer assembly at a very high velocity. Further, thermal asperities arising on the surface of a data storage disk are generally distributed in a highly random manner, and change in shape and size in response to changes in disk and ambient temperatures. A collision between a transducer and a thermal asperity often renders previously written data unreadable or unrecoverable, and typically results in a hard read error condition.

Magneto-resistive transducers are particularly susceptible to interference from contact with thermal asperities. It is well-known that magneto-resistive transducer elements are very sensitive to variations in temperature, and are frequently used as temperature sensors in other applications. A collision between a magneto-resistive transducer element and a thermal asperity results in the production of heat, and a corresponding rise in transducer element temperature. Such transient temperature deviations are typically associated with an inability of the magneto-resistive transducer element to read previously written data at the affected disk surface location, thereby rendering the stored information unrecoverable.

Many attempts have been made to determine the source of thermal asperities. No single mechanism has yet to be identified, and it is believed that thermal asperity defects arise from numerous sources. Moreover, conventional disk-level or system-level screening tests have proven to be ineffective in adequately detecting the presence of thermal asperities. A known technique for protecting a transducer against collision with a disk surface obstruction, as disclosed in U.S. Pat. No. 5,157,568, involves recessing the transducer into a cavity provided on the slider. This suggested solution increases the transducer-to-disk separation distance, reduces transducer readback signal sensitivity, and severely limits the degree to which disk recording densities can be increased. Another known technique, such as that disclosed in U.S. Pat. No. 4,669,011, involves the use of elaborate disk obstruction sensing and avoidance apparatus and electronics. This solution, however, increases the mass of the slider body, the complexity of the data channel electronics, and the overall cost of the data storage system.

There exists in the data storage system manufacturing industry a keenly felt need to provide a simple, effective, and low-cost solution for protecting a transducer element against collisions with randomly distributed thermal asperities and other disk surface irregularities. There exists a further need to provide such a solution that requires only minor modification to the existing configuration of the air bearing slider. The present invention fulfills these and other needs.

SUMMARY OF THE INVENTION

The present invention is directed to a method for fabricating an air bearing slider for a data storage system including a deflection apparatus disposed on the air bearing surface of the slider. The air bearing surface of the slider is fabricated to include a transducer element mounting location biased toward a trailing edge of the slider, and a deflection apparatus disposed proximate the transducer element mounting location and biased toward a leading edge of the slider. Contact between the deflection apparatus and an asperity or disk obstruction prevents damage to a transducer element mounted at the transducer element mounting location. In accordance with one embodiment, the deflection protrusion is fabricated to include a sloping leading edge or, alternatively, comprises a plurality of deflection ridges that generally define a sloping leading edge. Alternatively, a deflection notch is provided on the air bearing surface that effectively functions as a deflection protrusion to protect a transducer element mounting location from contact with a thermal asperity or other submicron-sized obstruction on the surface of a data storage disk. A set of design equations and guidelines may be employed to derive key design dimensions for designing the configuration, orientation, and location of the deflection apparatus on the air bearing surface relative to the transducer element mounting location.

BRIEF DESCRIPTION OF THE DRAWINGS

FIG. 8 is a table of key design dimensions derived in accordance with various design equations and guidelines applicable to a number of data storage systems having different industry standard form factors;

FIG. 14 is a table of key design dimensions for an air bearing surface including a novel deflection notch derived in accordance with various design equations and guidelines applicable to a number of data storage systems having different industry standard form factors.

DETAILED DESCRIPTION OF THE PREFERRED EMBODIMENTS

Figure 1:
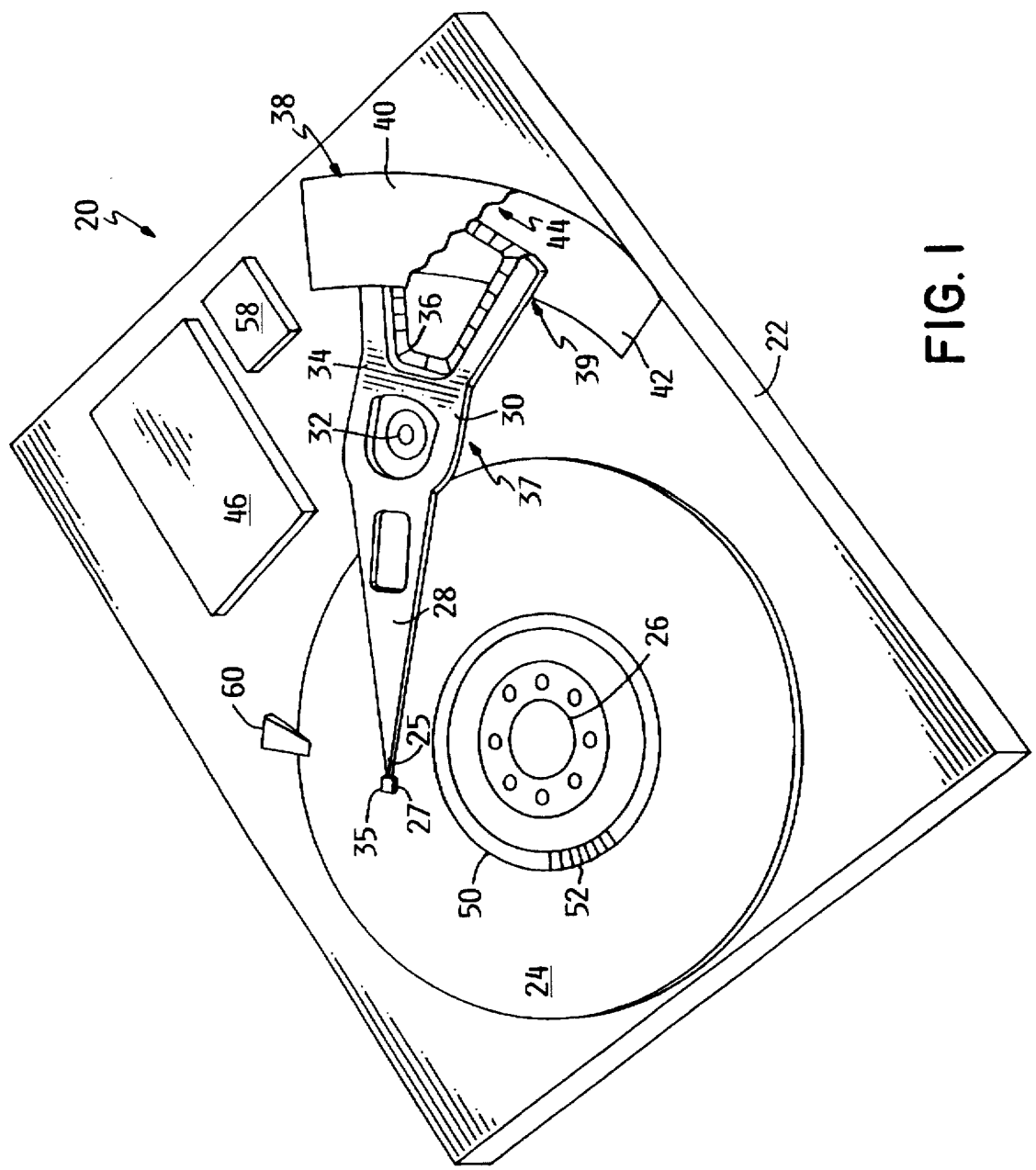
FIG. 1 is a top perspective view of a data storage system with its upper housing cover removed.
Figure 2:
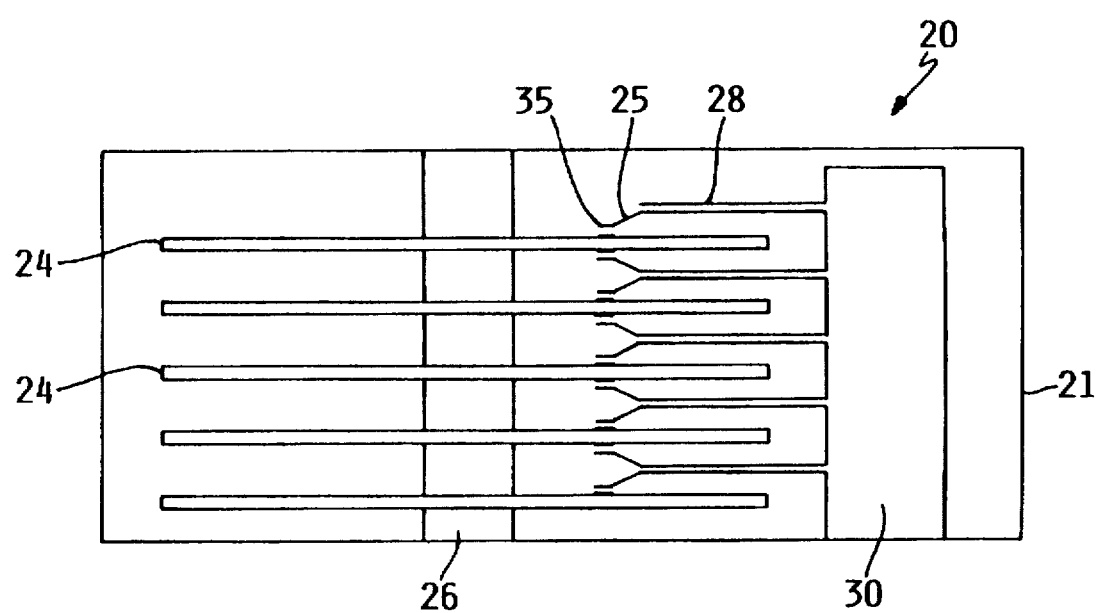
FIG. 2 is a side plan view of a data storage system comprising a plurality of data storage disks.

Referring now to the drawings, and more particularly to FIG. 1, there is shown a data storage system 20 with the cover 23 removed from the base 22 of the housing 21. A data storage system 20, as shown in FIG. 2, typically includes one or more rigid data storage disks 24 which are stacked coaxially in a tandem spaced relationship, and rotate about a spindle motor 26 at a relatively high rate of rotation. Each disk 24 is typically formatted to include a plurality of spaced concentric tracks 50, with each track being partitioned into a series of sectors 52 which, in turn, are further divided into individual information fields. One or more of the disks 24 may alternatively be formatted to include a spiralled track configuration.

An actuator 30 typically includes a plurality of interleaved actuator arms 28, with each arm having one or more transducer 27 and slider 35 assemblies mounted to a load beam 25 for reading and writing information to and from the data storage disks 24. The slider 35 is typically designed as an aerodynamic lifting body that lifts the transducer 27 off of the surface of the disk 24 as the rate of spindle motor 26 rotation increases, and causes the transducer 27 to hover above the disk 24 on an air bearing produced by high-speed rotation of the disk 24. A conformal lubricant may alternatively be disposed on the disk surface 24 to reduce static and dynamic friction between the slider 35 and disk surface 24.

The actuator 30 is usually mounted to a stationary actuator shaft 32, and rotates on the shaft to move the actuator arms 28 into and out of the stack of data storage disks 24. A coil assembly 36, mounted to a coil frame 34 of the actuator 30, generally rotates within a gap 44 defined between the upper and lower magnet assemblies 40 and 42 of a permanent magnet structure 38, causing the actuator arms 28, in turn, to sweep over the surface of the data storage disks 24. The spindle motor 26 typically comprises a polyphase, a.c. motor or, alternatively, a d.c. motor, energized by a power supply 46 and adapted for rotating the data storage disks 24.

The coil assembly 36 and the upper and lower magnet assemblies 40 and 42 of the permanent magnet structure 38 operate in cooperation as an actuator voice coil motor 39 responsive to control signals produced by a controller 58. The actuator voice coil motor 39 produces a torquing force on the actuator coil frame 34 when control currents of varying direction and magnitude flow in the coil assembly 36 in the presence of a magnetic field produced by the permanent magnet structure 38. The torquing forces imparted on the actuator coil frame 34, in turn, cause corresponding rotational movement of the actuator arms 28 in directions dependent on the polarity of the control currents flowing in the coil assembly 36. A controller 58 preferably includes control circuity that coordinates the transfer of data to and from the data storage disks 24, and cooperates with the actuator voice coil motor 39 to move the actuator arms 28 and transducers 27 to prescribed track 50 and sector 52 locations when reading and writing data to and from the disks 24.

Figure 3:
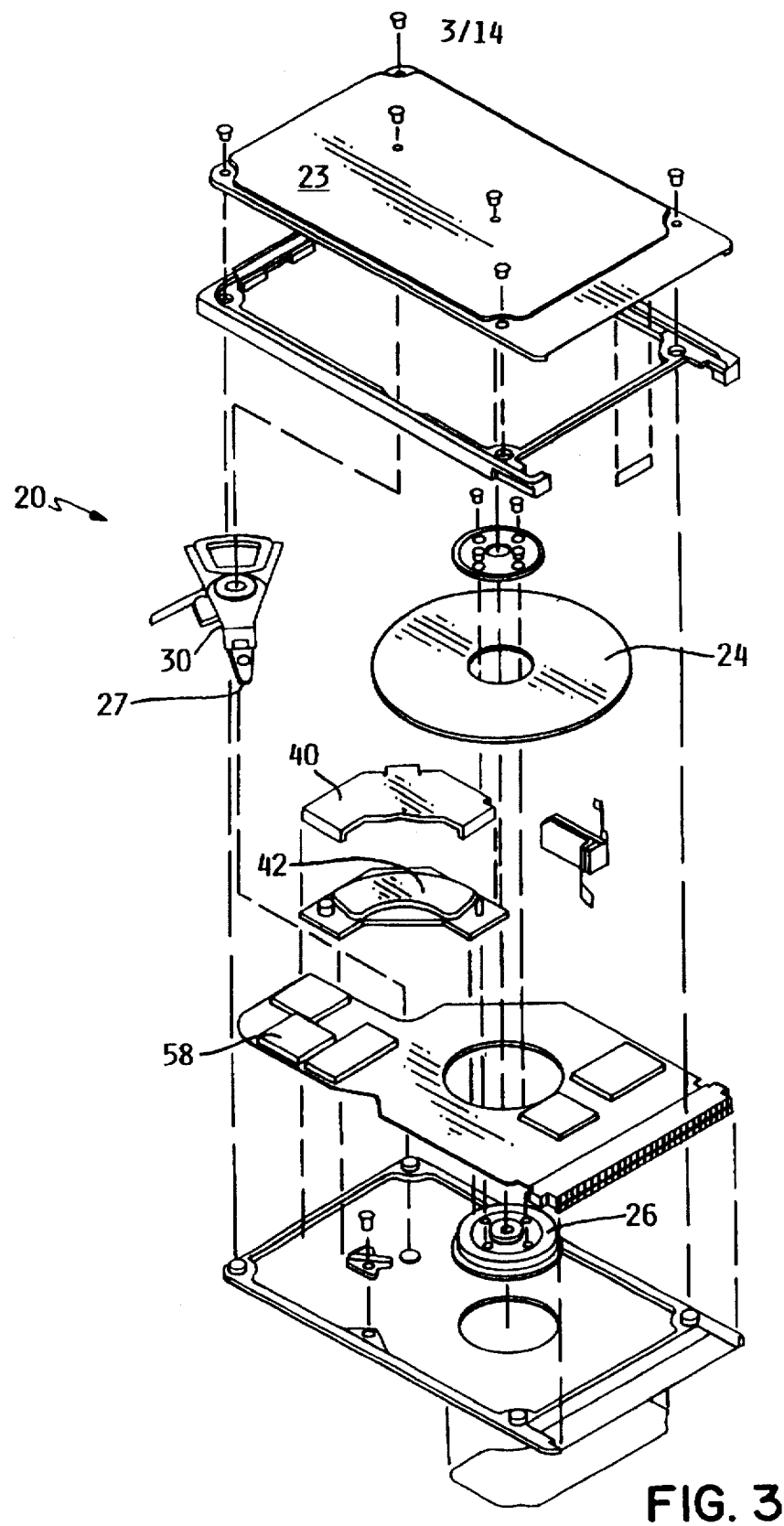
FIG. 3 is a perspective view of a data storage system having a relatively small form factor.

Referring now to FIG. 3, there is illustrated a data storage system 20 having a relatively small form factor, and having housing 21 dimensions generally conforming to one of the PCMCIA housing specifications previously discussed. The compact packaging configuration of small and very small form factor data storage systems 20 typically provides for only minimal separation distances and tolerances between adjacently mounted system components. The vertical or height dimension for a PCMCIA Type-II housing, for example, is specified as being 5 mm. Accordingly, the methodology for reducing readback signal sensitivity of the transducer 27 to thermal asperities arising on the surface of a data storage disk 24 must be constrained within an extremely compact housing environment.

The disclosed novel air bearing slider apparatus and method for fabricating same provides for exceptional protection against detrimental disk surface obstruction and transducer element contact for standard, small, and very small form factor data storage systems. The novel slider deflection apparatus advantageously provides for a substantial reduction in disk-to-transducer element spacing when reading and writing information to a disk surface, typically by one or more orders of magnitude in comparison to prior art air bearing slider configurations, such as the methodologies disclosed in the aforementioned cited patent references, for example.

Figure 4:
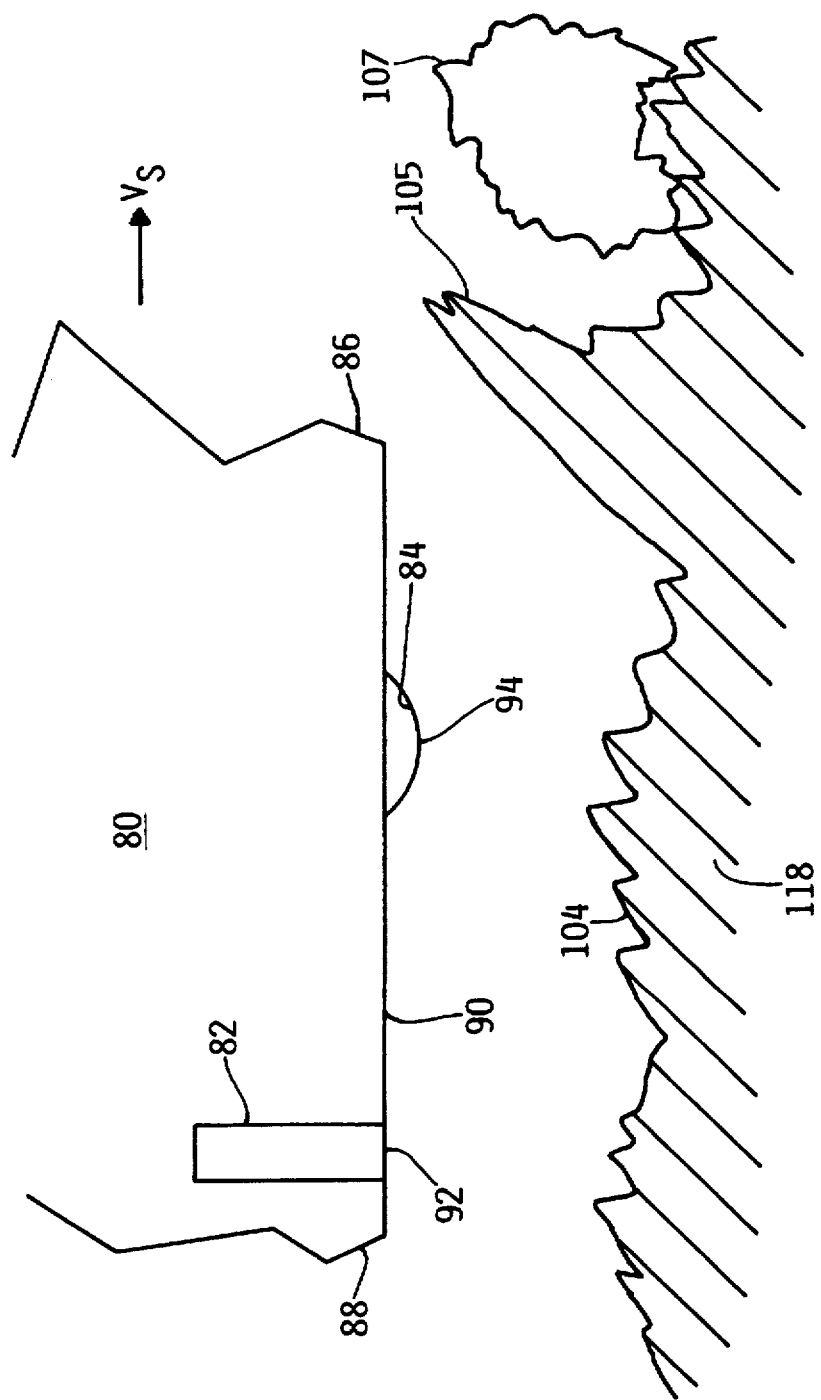
FIG. 4 is a partial sectional side view of a novel air bearing surface of a slider supported on an air bearing above a surface of a data storage disk.

Turning now to FIG. 4, there is illustrated a sectional side view of an embodiment of a novel air bearing slider 80 including an air bearing surface 90 and a transducer element mounting location 92 adapted for receiving a transducer element 82. Disposed on the novel air bearing surface 90 is a deflection protrusion 84 located proximate the transducer element mounting location 92. The deflection protrusion 84 prevents detrimental contact between a sensitive transducer element 82 disposed on the air bearing surface 90 at the transducer element mounting location 92 and an obstruction 107 or thermal asperity 105 on the surface 104 of the data storage disk 118.

It is noted that submicron-sized particulate contaminants, such as media debris particles or oil vapor particles devolving from a spindle motor bearing assembly, for example, may be present in the relatively contaminant-free environment within the disk enclosure, notwithstanding the presence of an air filtering apparatus. During normal data storage system activity, the air flow patterns produced by a rapidly rotating disk 118 typically cause such particulate contaminants 107 to become airborne, thus reducing the probability of interference between the particulate contaminant 107 and the slider body 80, and, more particularly, the transducer element 82 of the air bearing surface 90.

Of particular concern, however, are thermal asperities 105 that typically arise from the disk surface 104 in a highly randomized and unpredictable manner. The novel deflection protrusion 84 disposed on the air bearing surface 90 initially contacts a sufficiently large thermal asperity 105 or other obstruction 107 and deflects the slider 80 and transducer element 82 to avoid contact with the asperity 105 or obstruction 107. Advantageously, the deflection protrusion 84 is preferably small in height and area so as to insignificantly or only minimally affect the flying characteristics of the slider 80. Further, the deflection protrusion 84 is preferably fabricated from durable, non-abrasive, and non-ablative material so that intermittent contact with a thermal asperity 105 or other obstruction 107 does not result in rapid wear. Also, the aspect ratio or shape of the deflection protrusion 84 is preferably configured to preclude accumulation of debris that might otherwise induce a head crash.

Those skilled in the art can readily appreciate the advantages of preventing deleterious contact between a transducer element 82 and a disk surface 104 obstruction during data storage system activity, particularly when reading and writing information to the disk surface 104. A magneto-resistive transducer element 82, for example, is particularly sensitive to contact with a thermal asperity 105 or other obstruction 107 due in part to its inherent sensitivity to temperature variations. As previously discussed, intermittent contact with obstructions on the disk surface 104 results in a temperature increase in the magneto-resistive transducer element 82, and often renders the data written at the affected disk surface 104 location unreadable or unrecoverable.

The novel air bearing deflection apparatus of the present invention provides protection advantages for an air bearing slider 80 that incorporates a transducer element 82 other than a magneto-resistive element. A thin-film transducer element 82, for example, is generally insensitive to temperature variations associated with thermal asperity 105 or other obstruction 107 collisions. Many thin-film transducer elements 82 are configured to include write poles biased with a voltage potential, and are mounted near the air bearing surface 90 and exposed to the disk surface 104. Intermittent contact between a thin-film transducer element 82 and a thermal asperity 105 or obstruction 107 can result in arcing between the write poles and the disk surface 104. Such undesirable arcing frequently results in an inability to recover data previously written to the affected area of the disk surface 104.

Other slider 80 configurations that incorporate optical fiber elements at a transducer element mounting location 92 can also suffer varying degrees of performance degradation due to abrasions to the optical fiber probe element resulting from contact with a thermal asperity 105 or obstruction 107 on the disk surface 104. The deflection apparatus of the novel air bearing surface 90 prevents any such detrimental contact between a transducer element 82 disposed at the transducer element mounting location 92 and an obstruction on the surface 104 of a data storage disk 118.

Figure 5:
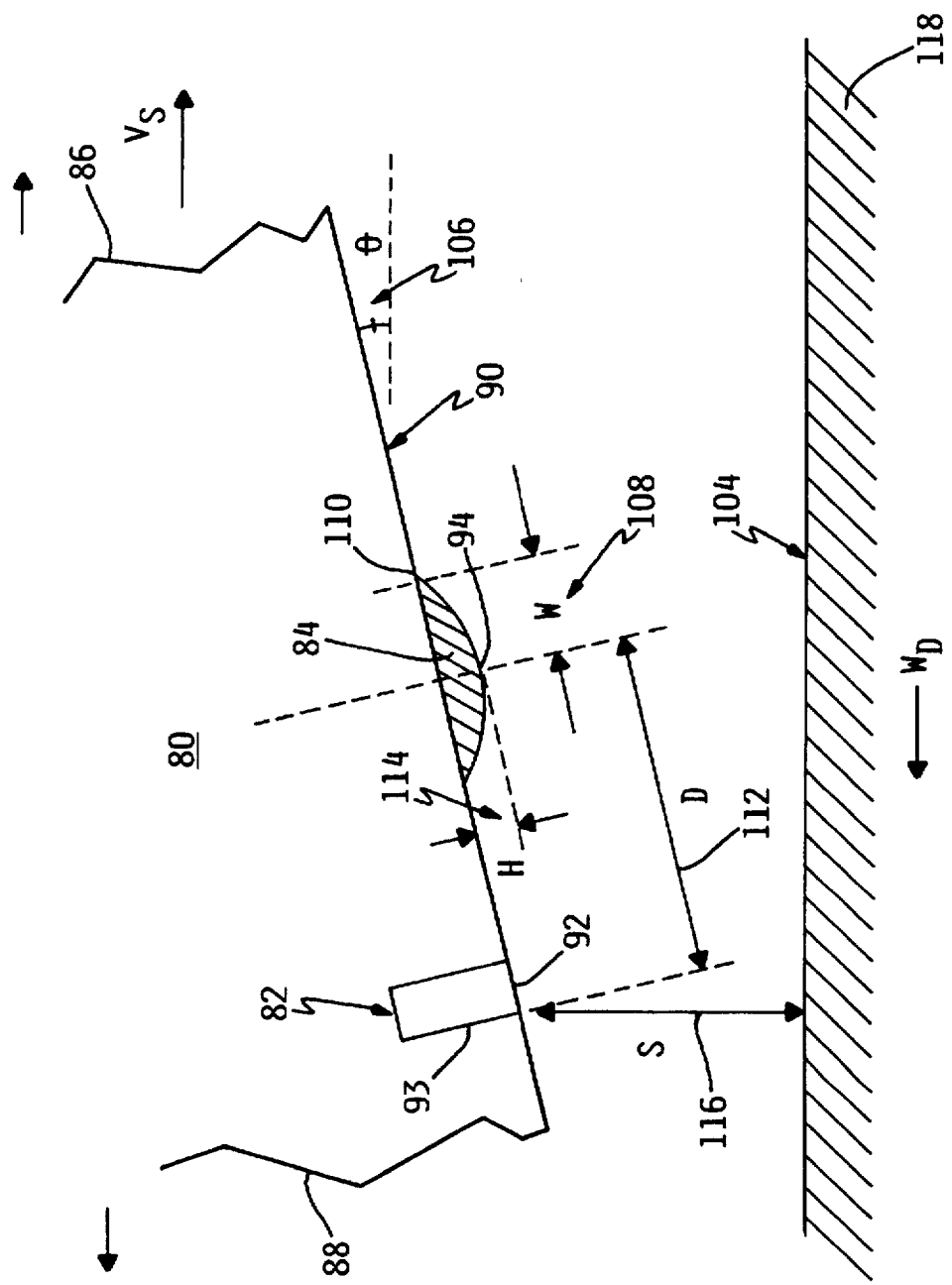
FIG. 5 is a partial sectional side view of a novel air bearing surface of a slider supported on an air bearing above a surface of a data storage disk, with a further depiction of various key design dimensions for locating a deflection apparatus on the air bearing surface relative to a transducer element mounting location.

Referring now to FIG. 5, there is illustrated a sectional side view of an air bearing slider 80 incorporating a novel deflection protrusion 84 on the air bearing surface 90. In practice, it is desirable to orient the air bearing surface 90 at a pitch angle (θ) 106 with respect to a plane defined by the surface 104 of the data storage disk 118. For purposes of illustration, the air bearing slider 80 is shown as having a forward velocity $V_S$ with respect to the disk surface 104. In actual practice, the data storage disk 118 rotates at a prescribed angular velocity $\omega_D$, typically on the order of 5,000 to 8,000 RPM, with the air bearing slider 80 remaining comparatively fixed with respect to the rapidly rotating disk surface 104. As viewed from the perspective of the air bearing slider 80, however, the slider 80 maintains an effective velocity $V_S$ in the direction indicated in FIG. 5 relative to the disk surface 104. Accordingly, a leading edge 86 and a trailing edge 88 are thus defined for the air bearing slider 80.

With further reference to FIG. 5, there is indicated key design dimensions associated with the configuration, orientation, and location of the novel deflection protrusion 84 disposed on the air bearing surface 90 relative to the transducer element mounting location 92. The important air bearing surface 90 design dimensions include: the height dimension (H) 114 of the deflection protrusion 84 measured from the air bearing surface 90 to a summit location 94 of the deflection protrusion 84; the deflection protrusion half-width dimension (W) 108 measured from the summit location 94 of the deflection protrusion 84 and a starting location 110 of the deflection protrusion 84 with respect to the leading edge 86 of the air bearing slider 80; the separation distance (D) 112 measured from the summit location 94 of the deflection protrusion 84 to the transducer element mounting location 92, and more particularly, to an end location 93 of the transducer element mounting location 92 with respect to the trailing edge 88 of the air bearing slider 80; the pitch angle (θ) 106 measured as the angle between the air bearing surface 90 and a plane defined by the surface 104 of the data storage disk 118; and the disk spacing dimension (S) 116 measured from the end location 93 of the transducer element mounting location 92 and the surface 104 of the data storage disk 118.

Having defined the important design dimensions for fabricating a novel air bearing surface 90 of an air bearing slider 80, the following design equations and guidelines are disclosed for purposes of designing and appropriately locating the novel deflection protrusion 84 relative to the transducer element mounting location 92 on the air bearing surface 90. In general, it is desirable to locate the deflection protrusion 84 close to the transducer element mounting location 92. Those skilled in the art will appreciate the difficulties and inherent limitations associated with manufacturing air bearing slider assemblies to include relatively small structures, such as the deflection protrusion 84, on the air bearing surface of the slider assembly in close proximity to a transducer element mounting location. The design equations developed by the inventor and disclosed hereinbelow provide design guidelines to derive key dimensions for configuring, orienting, and locating the novel deflection protrusion 84 on the air bearing surface 90 of a slider 80 relative to a transducer element mounting location 92.

It is desirable that the height (H) 114 of the deflection protrusion 84 be designed so that the deflection protrusion 84 does not contact a surface 104 of a data storage disk 118 free of thermal asperities 105 during normal flight of the air bearing slider 80 over the disk surface 104. Further, it is desirable, but not necessarily required, that no contact, or only a negligible amount of contact, between the deflection protrusion 84 and the disk surface 104 occur during takeoff and landing of the air bearing slider 80 during normal data storage system activity. It has been observed by the inventor that the rear portion of an air bearing slider 80 generally contacts the disk surface 104 during takeoff and landing of the slider 80. This fortuitous condition will typically result in only minimal or non-appreciable contact between an appropriately located deflection protrusion 84 and the disk surface 104 during slider 80 take off and landing sequences.

In order to minimize the probability of contact between the deflection protrusion 84 and the disk surface 104 during takeoff and landing, and to prevent undesirable contact between the deflection protrusion 84 and an asperity-free disk surface 104 during normal flight, it has been determined that the height (H) 114 of the deflection protrusion 84 must be substantially smaller than the sum of the disk spacing dimension (S) 116 and the separation distance (D) 112 multiplied by the sin of the pitch angle (θ) 106. This design equation is represented in algebraic form as:

$$H \ll S + D \cdot \sin(\theta).$$

A second design consideration concerns the deflection protrusion 84 half-width dimension (W) relative to the characteristic vertical translation time constant ($\tau_C$) of the air bearing produced between the air bearing surface 90 and the rotating disk surface 104. In general, an air bearing produced between the air bearing surface of a slider and a rotating disk surface has an inherent or characteristic vertical translation time constant ($\tau_C$) which is dependent on a number of factors, including the angular velocity of the rotating disk $\omega_D$, the surface area of the disk, the surface topography of the disk, the configuration of the housing or disk enclosure surrounding the disk and slider, and other environmental factors such as component and internal temperatures and pressure within the disk enclosure housing.

Various physical attributes of an air bearing slider also contribute to the response time of the slider to vertical displacements from a preferred reference height on the air bearing. Such physical attributes include the mass and configuration of the air bearing slider, the size and configuration of the air bearing surface, and the aerodynamic characteristics of the air bearing slider, for example.

It is desirable, upon contact between the deflection protrusion 84 and thermal asperity 105, that the deflection protrusion 84 vertically displace the slider 80 to avoid contact between the transducer element mounting location 92 and the thermal asperity 105. It is noted that the size and stiffness of an encountered thermal asperity 105 may influence the extent to which the slider 80 is vertically displaced upon impact between the deflection protrusion 84 and the thermal asperity 105. It has been observed that an asperity 105 of moderately low stiffness and mass will likely be momentarily depressed into the disk 118 substrate upon contact with the deflection protrusion 84. It has been further observed that the duration of time for the asperity 105 to positionally recover after being depressed into the disk 118 substrate is at least 10 to 100 times longer than the duration of time required for the air bearing slider 80 to regain nominal flight at a preferred reference height on the air bearing. As such, asperity recovery time is not considered a key design limitation.

It has been determined that the half-width dimension (W) must be substantially smaller than the flying height recovery distance of the air bearing slider 80, which is represented as the product of the effective slider 80 velocity ($V_S$) and the characteristic vertical translation time constant of the air bearing ($\tau_C$). This design equation is represented algebraically as:

$$W \ll V_s \times \tau_c.$$

A third design consideration concerns the separation distance (D) 112 which, as previously mentioned, is defined as the distance between a summit location 94 of the deflection apparatus and an end location 93 of the transducer element mounting location 92 with respect to the trailing edge 88 of the air bearing slider 80. It has been determined that the separation distance (D) 112 must be less than the flying height recovery distance of the air bearing slider 80. This third design equation is algebraically expressed as:

$$D < V_s \times \tau_c.$$

A fourth design consideration concerns the aspect ratio or slope of the leading edge of the deflection protrusion 84. It is important that any debris produced by contact between the deflection protrusion 84 and a thermal asperity 105 or other obstruction 107 be deflected from the surface of the deflection protrusion 84. By appropriately designing a small aspect ratio for the deflection protrusion 84, defined as the ratio of the deflection protrusion height dimension (H) 114 and the half-width dimension (W) 108 (i.e., H/W), the gradual slope of the deflection protrusion 84 will inhibit debris collection. It is noted that the trailing edge of the deflection protrusion 84 may be modified in configuration or eliminated in order to reduce the mass of the deflection protrusion 84.

Figure 6:
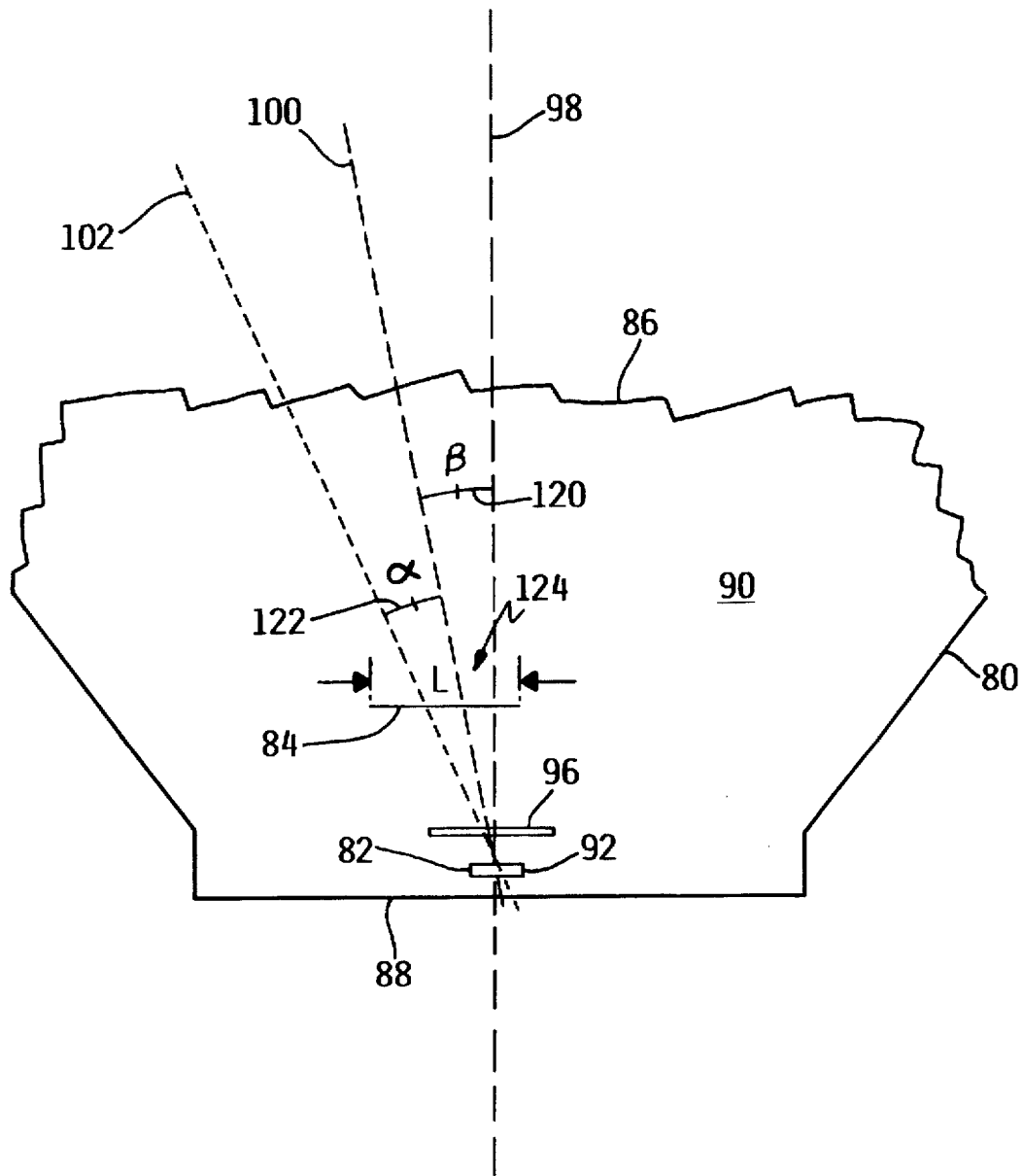
FIG. 6 is a partial bottom view of a novel air bearing surface of a slider having a longitudinal axis, with a deflection apparatus being offset with respect to the longitudinal axis to accommodate the skew range of the slider.

Turning now to FIG. 6, there is illustrated another design consideration that impacts the location of the deflection apparatus on the air bearing surface 90 relative to the location of the transducer element mounting location 92. In FIG. 6, there is illustrated a fragmented bottom view of an air bearing slider 80 having a longitudinal axis 98 defined through a centerline of the transducer element mounting location 92. It is to be understood that the depictions of the deflection apparatus and transducer element mounting location 92 in the Figures are for illustrative purposes only, and do not constitute a limitation on the configuration, orientation, location, or relative size of the slider 80 features.

The deflection apparatus is preferably offset from the longitudinal axis 98 in order to accommodate the range of slider 80 skew as the slider 80 travels between the inner diameter and outer diameter of the data storage disk 118. The range of slider 80 skew illustrated in FIG. 6 is designated as a skew angle ($\alpha$) 122 defined between an inner diameter skew axis 100 and an outer diameter skew axis 102. It is noted that the inner diameter skew axis 100 is displaced from the longitudinal axis 98 by a displacement angle ($\beta$) 120.

An additional design consideration concerns the length dimension (L) 124 of the deflection apparatus as illustrated in FIG. 6. The length dimension (L) 124 of the deflection protrusion 84, for example, is preferably long enough to accommodate the full range of slider 80 skew, indicated as the skew angle ($\alpha$) 122, as the slider 80 travels between the inner diameter skew axis 100 and outer diameter skew axis 102.

Figure 7:
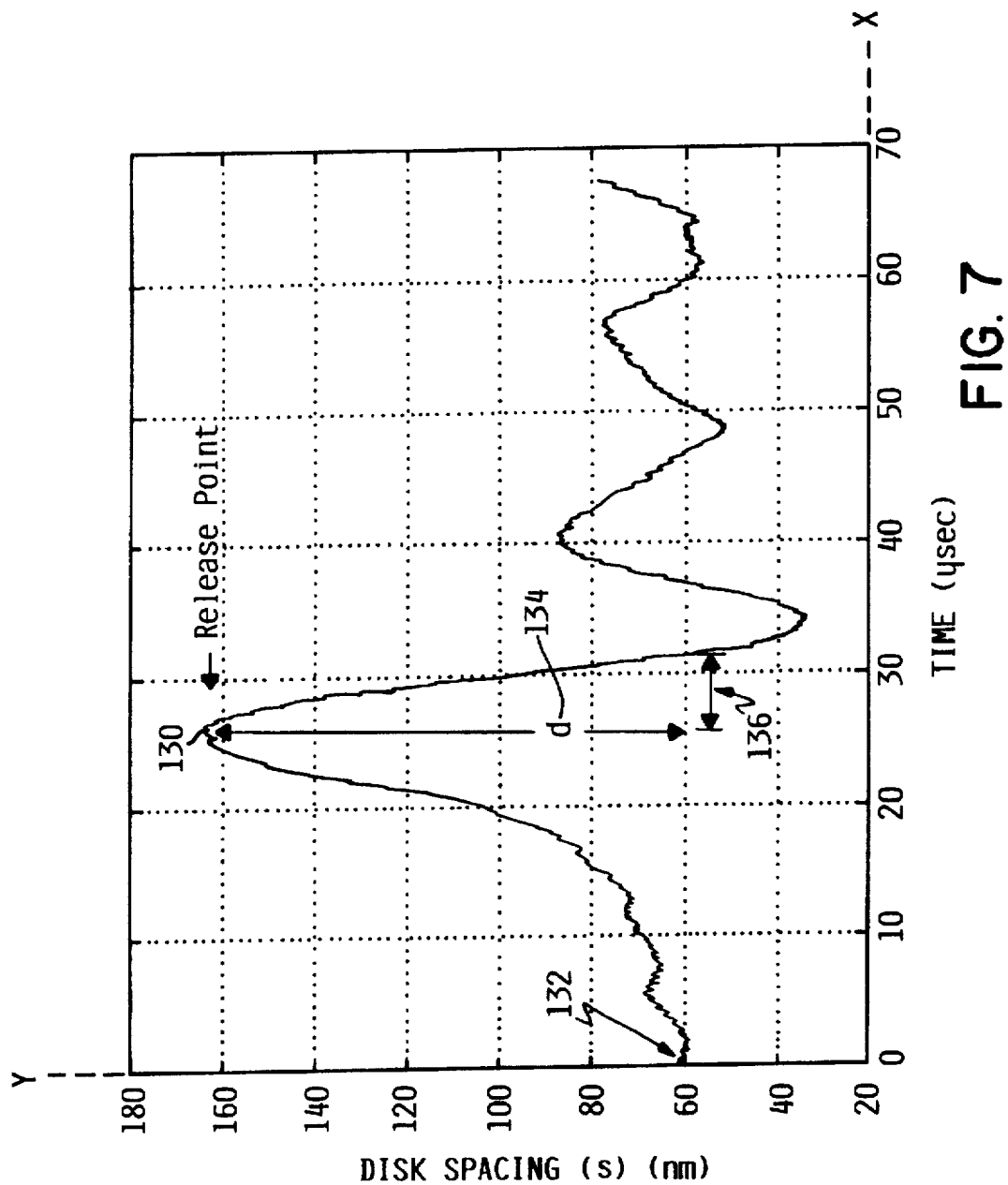
FIG. 7 is a time history plot for empirically deriving the value of the characteristic vertical translation time constant of an air bearing produced between a novel air bearing surface of a slider and a 3.5" data storage disk rotating at a rate of approximately 5,400 RPM.

By way of example, and not of limitation, values for the key design dimensions illustrated in FIG. 5 have been derived for a standard form factor data storage system having a 3.5" inch data storage disk 118 rotating at a rate of approximately 5,400 RPM or a velocity of approximately 11.3 meters per second (M/s). With reference to FIG. 7, the characteristic vertical translation time constant ($\tau_C$) of the air bearing was empirically derived for an air bearing slider 80 located at an inner diameter skew axis 100 location of the disk 118. The values of the key design dimensions derived with the slider 80 located near the inner diameter of the data storage disk 118 represent worst case values, since the air bearing between the rotating disk surface 104 and slider 80 is at a relative minimum due to decreasing angular velocities near the inner diameter of the disk 118. At outer diameter disk 118 locations, the angular velocities are higher than at inner diameter disk 118 locations, thereby providing for increased clearance between the disk surface 104 and air bearing slider 80.

As shown in FIG. 7, a time history plot is provided from which the characteristic time constant ($\tau_C$) was empirically derived for an air bearing produced by the 3.5" disk 118 rotating at approximately 5,400 RPM. It is noted that time, measured in microseconds, is plotted along the X-axis and disk spacing (S), measured in nanometers (nm), is plotted along the Y-axis. The time required for the air bearing slider 80 to recover from being released at a release point 130 of approximately 160 nanometers above the disk surface 104 to a reference disk spacing distance (S) 132 is approximately 6 microseconds. This time interval corresponds to a rather large vertical displacement of the slider 80 on the order of approximately 100 nanometers. It is believed that contact between the displacement protrusion 84 and thermal asperities 105 on the disk surface 104 typically results in vertical displacements substantially less than 100 nanometers, typically on the order of approximately 10 nanometers. An air bearing slider 80 vertical displacement of approximately 10 nanometers is associated with a corresponding recovery time in excess of six microseconds. For purposes of explanation, a characteristic vertical translation time constant ($\tau_C$) of 10 microseconds will be assumed.

By applying the previously described design equations and using key dimensions associated with the 3.5" data storage disk 118 rotating at approximately 5,400 RPM, the following design configuration parameters are provided:

Assumptions:

$V_S$=11.3 meters/second
$\tau_C$=10 microsecondss
Design Dimensions:
$\theta$=120 microradians
S=50 nanometers H=10 nanometers D=100 microns W=20 microns By way of further example, and not of limitation, the key design dimensions for data storage systems having other industry standard form factors are provided in tabular and graphical form in FIGS. 8 and 9. In FIG. 8, there is tabulated key design dimensions derived using the disclosed design equations and guidelines for data storage systems incorporating 1.8", 2.5", 3.5", and 5.25" diameter data storage disks. The data tabulated in FIG. 8 provides a basis for establishing additional design guidelines, expressed as ranges of ratios, with regard to the relationship between the height dimension (H) 114 of the deflection apparatus, the half-width dimension (W) 108, and the separation distance (D) 112 between the deflection apparatus, and the transducer element mounting location 92 on the air bearing surface 90:

Range of the Ratio W/D=(0.15 to 0.25);

Range of the Ratio H/D=(0.0001 to 0.001).

These two additional guidelines are generally appropriate for designing a novel air bearing surface 90 that incorporates a deflection apparatus for data storage systems having varied form factor configurations.

Figure 9:
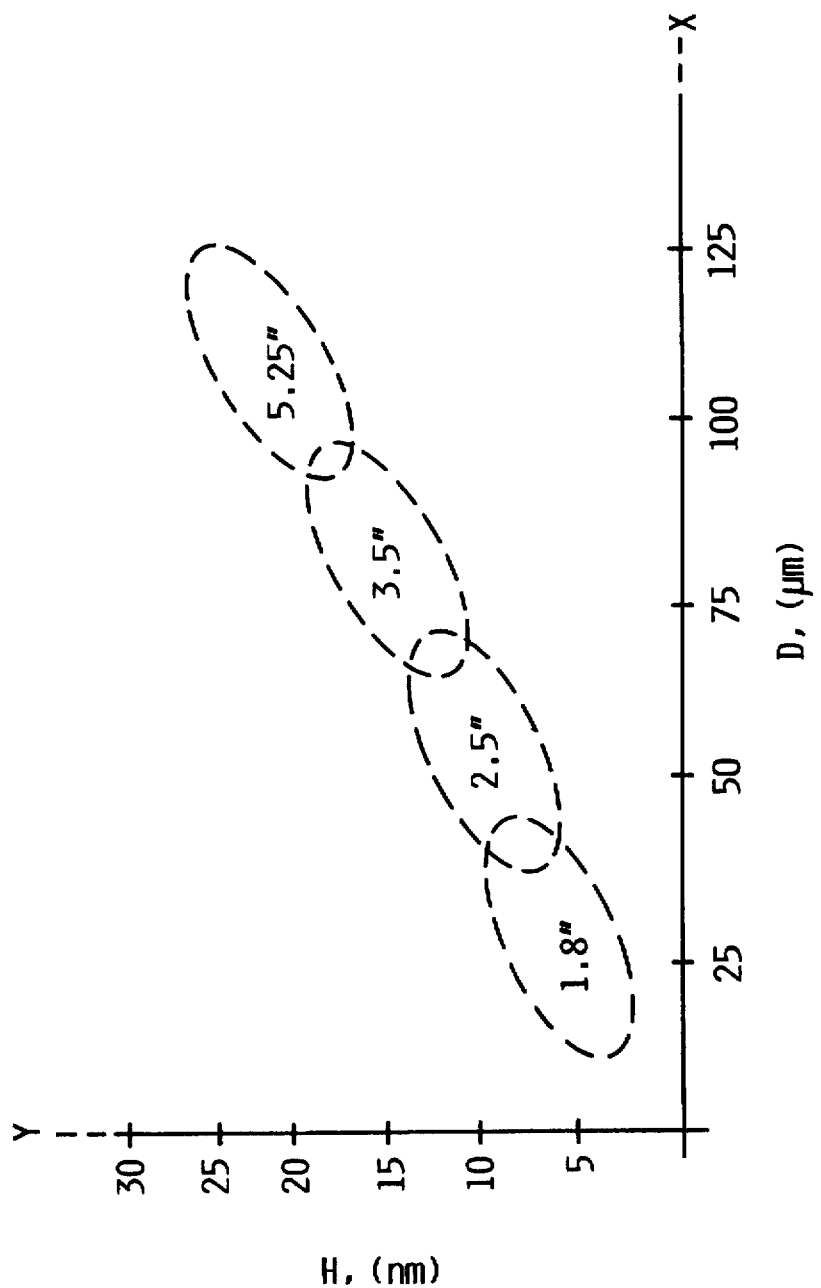
FIG. 9 is a graph depicting a range of height dimensions (H) of a deflection apparatus and separation distances (D) between the deflection apparatus and a transducer mounting location on an air bearing surface computed for a number of data storage systems having different industry standard form factors.

In FIG. 9, there is graphically depicted estimated ranges for the height dimensions (H) 114 of the deflection protrusion 84 and the separation distances (D) 112 for each of the indicated standard data storage system form factors. It is to be understood that the disclosed design equations and guidelines are approximations, and can be employed when designing air bearing surfaces 90 for slider 80 assemblies other than those employed in industry standard form factor data storage systems.

Figure 10:
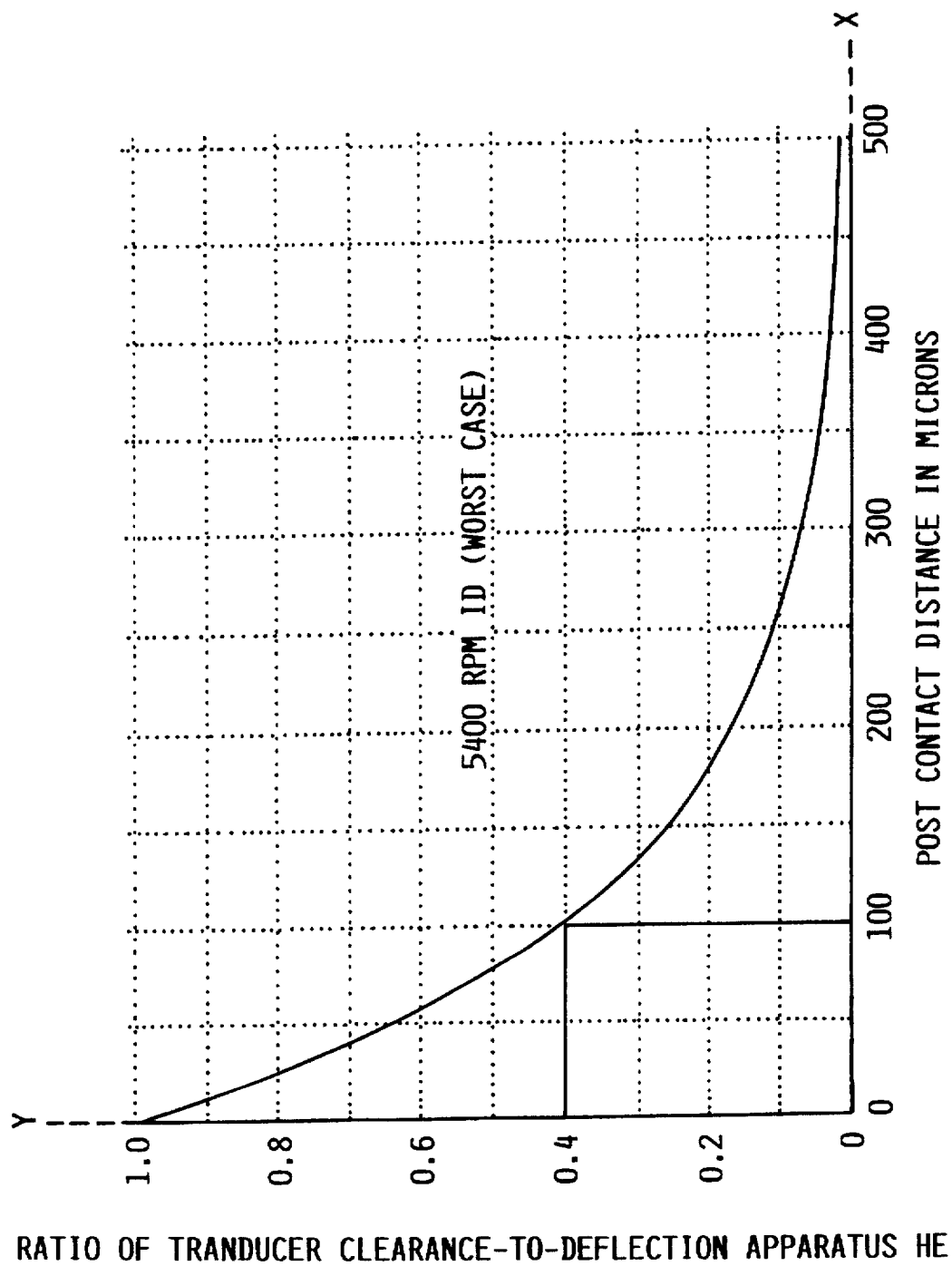
FIG. 10 is a plot of the ratio of transducer element clearance-to-deflection apparatus height versus post contact distance travelled by a novel slider after contacting an asperity on the surface of a data storage disk.

In FIG. 10, there is shown a graph illustrating the relationship between the ratio of transducer element 82 clearance and deflection protrusion 84 height (H) as a function of slider 80 distance travelled after contacting a thermal asperity 105 on the disk surface 104. The post contact distance of the slider 80, measured in microns, after contacting an asperity 105 is plotted along the X-axis. The ratio of transducer element 82 clearance above an encountered asperity 105 to the height dimension (H) of the deflection apparatus is plotted along the Y-axis of the graph. The data points for the graph were derived for a 3.5" disk 118 rotating at a velocity of approximately 5,400 RPM with the air bearing slider 80 positioned near the inner diameter of the disk 118.

It is noted that contact between the transducer 82 and a thermal asperity 105 on the disk surface 104 would occur at (X,Y) coordinates of (0,0). It can be seen, for example, that with a separation distance (D) of the approximately 100 micrometers, there remains a considerable amount of clearance between the transducer element 82 and the disk asperity 105. When the post-contact distance is 100 microns, for example, the transducer element mounting location 92 remains approximately four nanometers (0.4×10 nm) above the obstruction 105. At outer diameter disk 118 locations, where radial velocities are higher, this clearance will be even greater.

Figure 11:
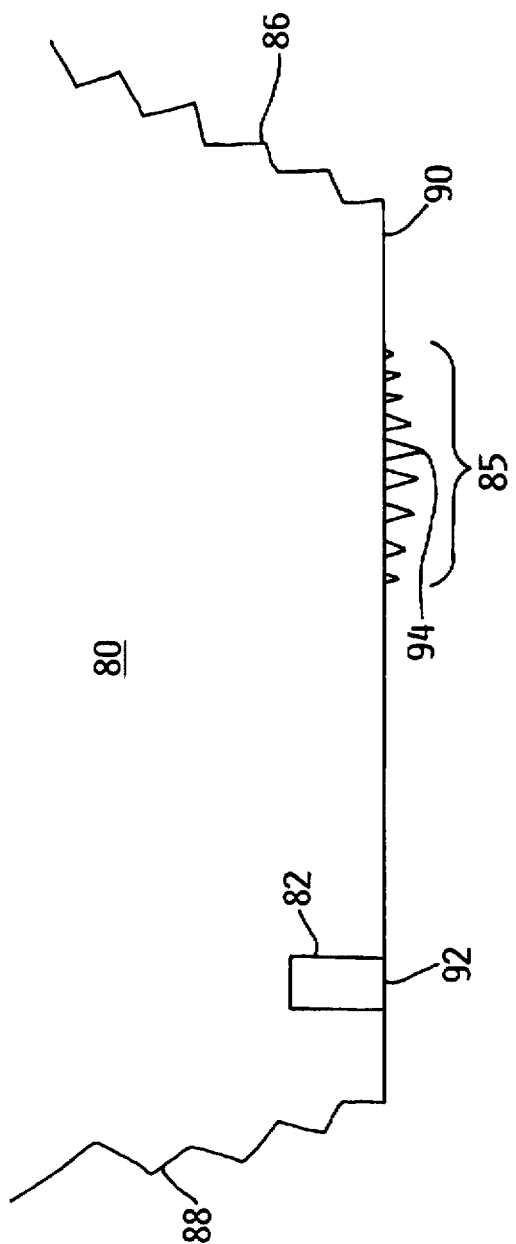
FIG. 11 is a partial side sectional view of another embodiment of a novel deflection apparatus that includes a plurality of deflection ridges that generally define the leading edge of the deflection apparatus.
Figure 12:
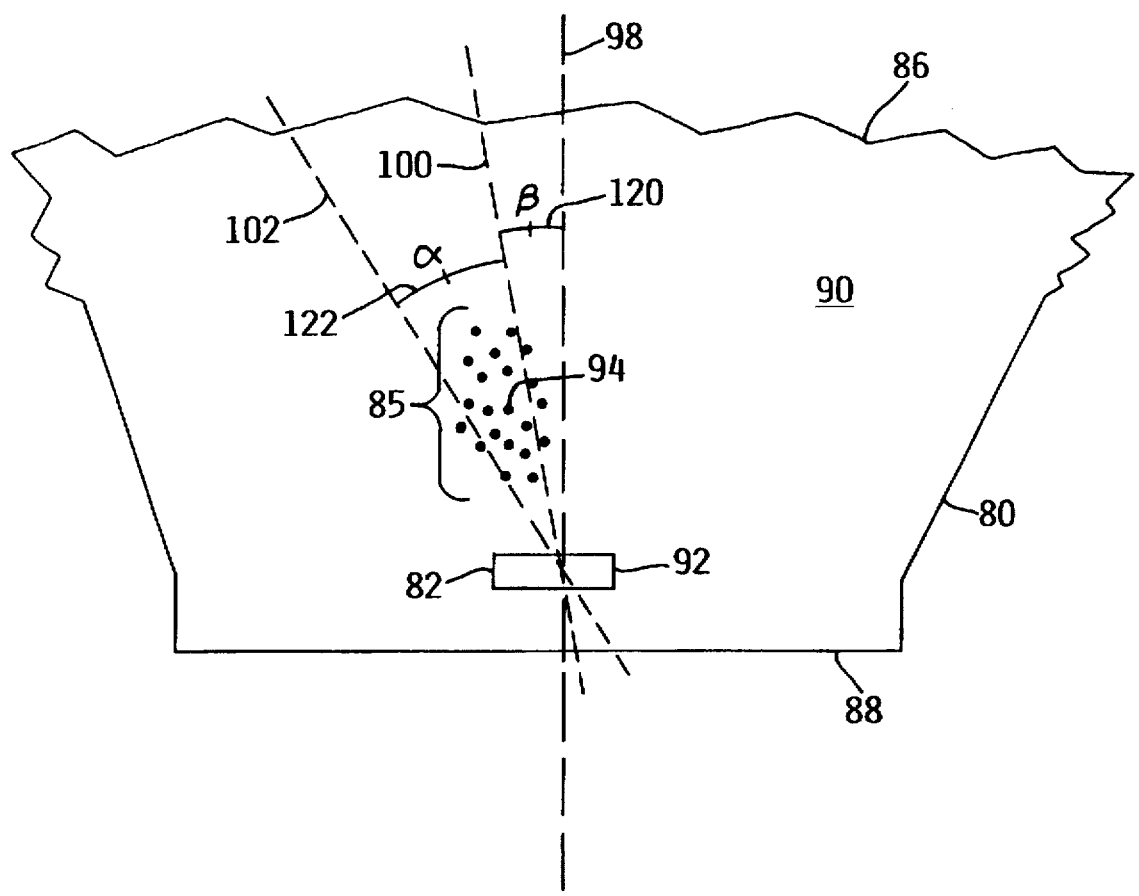
FIG. 12 is a partial bottom plan view of an embodiment of a novel deflection apparatus that includes a plurality of spaced deflection ridges.

Referring now to FIGS. 11 and 12, an alternative embodiment of a novel air bearing surface 90 is illustrated. The deflection apparatus is shown as including a plurality of deflection ridges 85 having varying height dimensions. In one embodiment, the deflection ridges 85 preferably vary in height from a minimum dimension near the leading and trailing edges 86 and 88 of the slider 80 to a maximum dimension at a summit location 94. In another embodiment, the deflection ridges 85 are preferably distributed on the air bearing surface 90 to generally define a wedge shape with respect to the leading edge 86 of the slider 80, with height dimensions varying from a minimum near the leading edge 86 to a maximum at a summit location 94. It is to be understood that the design equations and guidelines are similarly applicable to the deflection apparatus employing a plurality of deflection ridges 85 as embodied in the illustrations of FIGS. 11 and 12.

In the embodiment illustrated in FIG. 12, the deflection ridges 85 are preferably distributed in a spaced and staggered orientation on the air bearing surface 90. Such a distribution advantageously reduces the volume of air displaced by the deflection ridges 85 as the slider 80 floats on the air bearing produced between the air bearing surface 90 of the slider 80 and a rapidly rotating disk surface 104. An appreciable reduction in the mass of the deflection apparatus is also realizable. It is noted that the deflection ridges 85 disposed between the trailing edge 88 of the slider 80 and a summit location 94 may be modified in configuration or eliminated to further reduce the mass of the slider 80, and to further reduce the volume of air displaced by interaction between the deflection apparatus and the air bearing.

Figure 13:
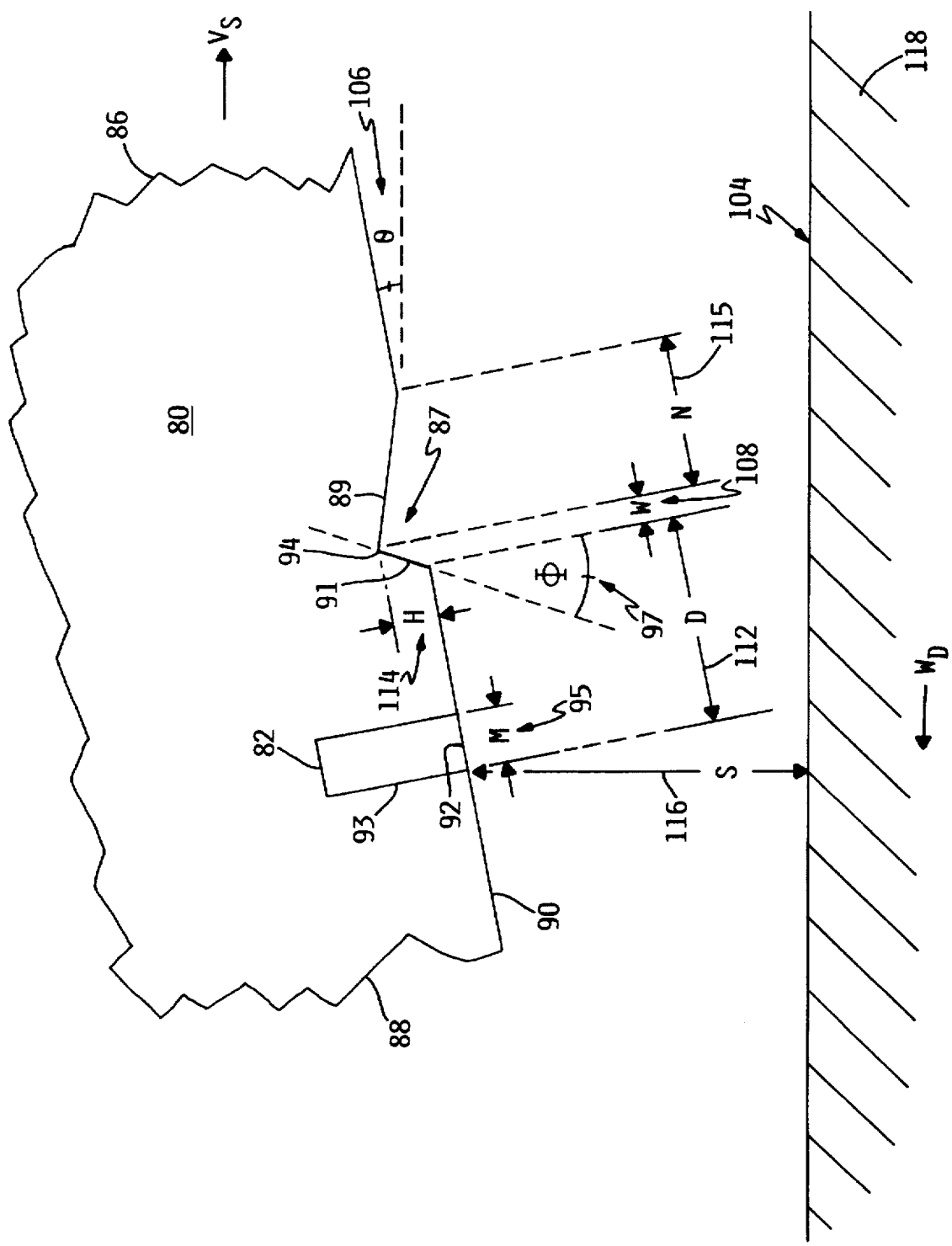
FIG. 13 is a partial side sectional view of another embodiment of a novel air bearing surface including a deflection notch that effectively functions as a deflection protrusion to protect a transducer element mounting location against contact with a disk asperity or obstruction.

Another embodiment of a novel air bearing surface 90 employing a deflection apparatus is illustrated in FIG. 13. A deflection notch 87, or recess, is preferably provided on the air bearing surface 90. The deflection notch 87 performs a deflection function substantially equivalent to that provided by the deflection protrusion 84 and deflection ridges 85 respectfully illustrated in FIGS. 4–5 and FIGS. 11–12. The air bearing surface 90 is preferably oriented at a pitch angle (θ) 106 with respect to the disk surface 104, thereby exposing a deflection edge 91 of the deflection notch 87 to a sufficiently large thermal asperity 105 or other submicron-sized obstruction 107 in the flight path of the slider 80. In this regard, the deflection edge 91 effectively functions as a deflection protrusion by virtue of the geometry of the deflection notch 87 and the pitch angle (θ) 106 of the slider 80 with respect to the disk surface 104.

A significant advantage of the novel deflection notch 87 embodiment illustrated in FIG. 13 concerns the profile of the air bearing surface 90. An absence of a protruding structure on the air bearing surface 90 decreases the likelihood of unintended interference between the slider 80 and disk surface 104 during normal data storage system operation. Further, an air bearing surface 90 incorporating a deflection notch 87 is generally simple to manufacture using traditional etching, machining, or other fabrication techniques. Also, disruption to the air bearing will likely be reduced, due in part to the relatively aerodynamically stagnant recessed portion of the deflection notch 87.

The design equations and guidelines for deriving key dimensions for configuring, orienting, and locating the deflection notch 87 on the air bearing surface 90 of a slider 80 relative to a transducer element mounting location 92 are substantially equivalent to those associated with the embodiments employing a deflection protrusion 84 or a plurality of deflection ridges 85. With reference to FIGS. 13 and 14, additional key dimensions associated with the geometry of the deflection notch 87 embodiment include: the notch length (N) 115; the length (M) 95 of the transducer element mounting location 92; and the edge angle (Φ) 97 of the deflection edge 91. In general, the following additional design equations are applicable to a variety of sliders for data storage systems having varying form factor configurations:

$N \gg V_s \times \tau_c$ $0° < \Phi < 90°$ $H < S$ $M \leq D < V_s \times \tau_c$.

The notch length (N) 115 and edge angle ($\Phi$) 97 of the deflection edge 91 are preferably dimensioned to promote contact between a thermal asperity 105 or disk obstruction 107 and the deflection edge 91, while minimizing accumulation of debris that might occur within the deflection notch 87. The edge angle ($\Phi$) 97 of the deflection edge 91 must generally be greater than 0° in order to be manufacturable, and less than 90° in order to be functionally effective. Further, the height (H) 114 of the deflection notch 87 relative to the air bearing surface 90 must generally be smaller than the disk spacing dimension (S) 116 to preclude contact between the transducer element mounting location 92 and the disk surface 104 when an asperity 105 or other obstruction 107 is within the deflection notch 87. Also, the length (M) 95 of the transducer element mounting location 92 must generally be less than or equal to the separation distance (D) 112 between the deflection notch 87 and the transducer element mounting location 92 on the air bearing surface 90. Finally, the separation distance (D) 112 must generally be less than the flying height recovery distance ($V_s \times \tau_c$) of the air bearing slider 80.

In accordance with the additional design equations for deriving key design dimensions for an air bearing surface 90 employing a novel deflection notch 87, the following dimensions are generally appropriate for a data storage system including a 3.5" diameter data storage disk 118 rotating at approximately 5,400 RPM:

$D = 100$ micrometers $\pm 5\mu$ $\Phi = 10° \pm 1°$ $H = 30$ nanometers $\pm 5$ nm $N = 200$ micrometers $\pm 10\mu$ Key design dimensions for data storage systems having other industry standard form factors are provided in tabular form in FIG. 14. In FIG. 14, there is tabulated key design dimensions derived using the disclosed design equations and guidelines for data storage systems incorporating 1.8", 2.5", 3.5", and 5.25" diameter data storage disks.

An important advantage of the air bearing surface 90 concerns a substantial reduction in the nominal disk-to-transducer spacing (S) 116 dimension. The novel deflection apparatus disclosed herein protect a transducer element 82 mounted at the transducer element mounting location 92 of the air bearing surface 90 from detrimental contact with disk asperities 105 and other disk surface obstructions 107. Disk-to-transducer spacing (S) 116 distances in the range of approximately 30 to 60 nanometers are achievable when employing a novel air bearing slider 90 designed and fabricated in accordance with the present invention. The significant decrease in disk-to-transducer spacing advantageously results in increased transducer 82 readback signal sensitivity and increased data storage disk 118 recording densities. The disk-to-transducer spacings associated with a conventional air bearing slider, in contrast, typically fall within a range of 5 to 7 micrometers (see, e.g., U.S. Pat. No. 5,062,017), which represents a one-hundred-fold increase in the disk spacing (S) dimension over that provided by the novel slider 80 of the present invention.

Another important advantage concerns the relative simplicity by which the novel deflection apparatus can be fabricated using common processing methodologies. The deflection protrusion 84 and deflection ridges 85 are preferably fabricated using known sputtering techniques. A sputtering mask is preferably prepared to accommodate the key dimensions of the deflection protrusion 84 or deflection ridges 85 relative to the transducer element mounting location 92 on the air bearing surface 90. The mask, or series of masks, may be prepared to develop the configurations of the deflection apparatus in accordance with the embodiments illustrated in FIGS. 4–5 and 11–12, respectively. The key dimensions are preferably derived by employing the previously disclosed design equations and guidelines. Prior to the sputtering process, the air bearing surface 90 of the slider 80 is preferably fabricated to include a transducer element 82 and to form the surface of the air bearing surface 90.

Known reactive ion etching techniques and appropriate masks that define the air bearing surface 90 geometry in accordance with the aforementioned design considerations and equations are preferably employed. After forming the air bearing surface 90 and transducer element 82, the steps required to form the deflection protrusion 84 or deflection ridges 85 are then performed. It is noted that a slider 80 employing a novel deflection notch 87 may be fabricated using reactive ion etching and/or machining techniques.

The deflection protrusion mask is placed over the air bearing surface 90 to expose the appropriate area on the air bearing surface 90 designated for forming the deflection apparatus. It is desirable to use a diamond-like material for the deflection protrusion 84 and deflection ridges 85 or other suitable material which exhibits exceptional hardness, is non-abrasive, and non-ablative. Various silicon carbide or titanium carbide compounds may be employed.

In an alternative embodiment, a prefabricated deflection protrusion 84 fashioned from a suitable material, such as a diamond-like material or titanium alloy, may be bonded to the air bearing surface 90. Also, a plating process may be employed using sufficiently hard metals, such as nickel alloys, for example, to form the deflection protrusion 84. In another alternative embodiment, the slider 80 may be fabricated from silicon, and the air bearing surface 90 may be developed using known etching techniques. Additional etching steps may be employed to develop the deflection protrusion 84, deflection ridges 85, or deflection notch 87 on the air bearing surface 90.

It will, of course, be understood that various modifications and additions can be made to the embodiments discussed hereinabove without departing from the scope or spirit of the present invention. For example, the key design dimensions may be modified from the suggested values to suit different manufacturing processes, different air bearing slider configurations, and different data storage system form factors. For example, systems employing data storage disks having diameters of 8", 5.25", 2.5", and 1.8", and various rates of rotation, will likely have differing performance characteristics. Application of the aforementioned design equations to accommodate such differing performance characteristics and configurations will generally produce key design dimensions different from those suggested hereinabove and illustrated in the Figures. Moreover, a range of values for each key design dimension will generally be valid. Also, materials and manufacturing techniques other than those specified herein may be employed when fabricating the air bearing slider and the deflection protrusion. Accordingly, the scope of the present invention should not be limited to the particular embodiments discussed above, but should be defined only by the claims set forth below and equivalents of the disclosed embodiments.

What is claimed is:

1. A method for fabricating a deflection apparatus on an air bearing slider for a data storage system having a rotatable data storage medium, the method comprising the steps of:

providing the air bearing slider;

etching an air bearing surface of the slider using a mask to define the geometry of the air bearing surface to accept a transducer element and the deflection apparatus;

providing the transducer element on the air bearing surface; and forming the deflection apparatus on the air bearing surface proximate the transducer element, the deflection apparatus having a height dimension (H) sufficient in magnitude to displace the transducer element from contacting an obstruction on the rotatable data storage medium, wherein the deflection apparatus is formed by any one of bonding, etching, plating, or sputtering material onto the air bearing surface to create either one of a deflection protrusion or a plurality of protrusion ridges.

2. A method as claimed in claim 1, wherein the step of forming the deflection apparatus includes the step of forming a deflection protrusion on the air bearing surface.

3. A method as claimed in claim 1, wherein the step of forming the deflection apparatus includes the step of forming a plurality of deflection ridges on the air bearing surface.

4. A method as claimed in claim 1, wherein the step of forming the deflection apparatus includes the step of forming a deflection notch on the air bearing surface.

5. A method as claimed in claim 1, wherein the step of forming the deflection apparatus includes the steps of:

forming the deflection apparatus on the air bearing surface to a height (H) ranging between about 10 nanometers to about 80 nanometers with respect to the air bearing surface; and forming the deflection apparatus on the air bearing surface within a separation distance (D) ranging between about 25 micrometers to about 170 micrometers from the transducer element mounting location.

6. A method as claimed in claim 1, wherein the step of forming the deflection apparatus includes the step of forming a deflection protrusion on the air bearing surface relative to the transducer element in accordance with the following equations:

$$H<<S+D(\sin \theta);$$

$$W<<V_S \times \tau_C; \text{ and}$$

$$D<V_S \times \tau_C;$$

where:

the pitch angle ($\theta$) is defined as an angle between the air bearing surface and a surface of the data storage medium;

the height dimension (H) is defined as the height of a summit location of the deflection protrusion;

the half-width dimension (W) is defined as the distance between a starting location of the deflection protrusion with respect to a leading edge of the slider and the summit location of the deflection protrusion;

the separation distance (D) is defined as the distance between the summit location of the deflection protrusion and the transducer element;

the disk spacing dimension (S) is defined as the distance between the surface of the data storage medium and the transducer element;

$V_S$ is defined as a velocity of the slider relative to a velocity of the data storage medium; and $\tau_C$ is a characteristic vertical translation time constant of an air bearing interposing the data storage medium and a surface of the data storage medium.

7. A method as claimed in claim 1, wherein the step of forming the deflection apparatus includes the step of forming a deflection notch on the air bearing surface relative to the transducer element in accordance with the following equations:

$$N>>V_S \times \tau_C$$

$$0°<\Phi<90°$$

$$H<S$$

$$M \leq D<V_S \times \tau_C$$

where:

the notch length (N) is defined as the length of the deflection notch;

the length (M) is defined as the length of the transducer element mounting location;

the edge angle ($\Phi$) is defined as the angle of a deflection edge of the deflection notch;

the height dimension (H) is defined as the height of a summit location of the deflection notch;

the separation distance (D) is defined as the distance between the summit location of the deflection notch and the transducer element mounting location;

the disk spacing dimension (S) is defined as the distance between the surface of the data storage medium and the transducer element mounting location;

$V_S$ is defined as a velocity of the slider relative to the velocity of the data storage medium; and $\tau_C$ is a characteristic vertical translation time constant of an air bearing interposing the data storage medium and a surface of the data storage medium.

* * * * *